United States Patent [19]

Chambers

[11] Patent Number: 4,661,261

[45] Date of Patent: Apr. 28, 1987

[54] ALUMINA STABILIZATION IN INDUSTRIAL WATERS

[75] Inventor: Bruce C. Chambers, Clarendon Hills, Ill.

[73] Assignee: Nalco Chemical Company, Naperville, Ill.

[21] Appl. No.: 864,358

[22] Filed: May 19, 1986

[51] Int. Cl.$^4$ ............................................. C02F 5/10
[52] U.S. Cl. ................................... 210/698; 252/180
[58] Field of Search ................ 210/698, 701; 252/180, 252/181

[56] References Cited

U.S. PATENT DOCUMENTS

| | | | |
|---|---|---|---|
| 3,463,730 | 8/1969 | Booth et al. | 210/701 |
| 3,898,037 | 8/1975 | Lange et al. | 210/701 |
| 4,443,340 | 4/1984 | May et al. | 210/701 |

Primary Examiner—David Sadowski
Assistant Examiner—Jeffrey W. Peterson
Attorney, Agent, or Firm—John G. Premo; Donald G. Epple

[57] ABSTRACT

A method of stabilizing alumina precipitates in industrial waters has been discovered. The method involves the addition to industrial water of effective amounts of low molecular weight multi-functional carboxylic acids, particularly citric acid and its water soluble salts.

1 Claim, No Drawings

ALUMINA STABILIZATION IN INDUSTRIAL WATERS

INTRODUCTION

Recirculating industrial waters used for heat exchange purposes are commonly treated with various chemicals to inhibit the formation of scales and to also inhibit corrosion of metal surfaces exposed to these circulating waters. The types of scales normally inhibited include hardness scales of various kinds, such as calcium carbonate, calcium sulfate, and the like. Occasionally, different kinds of scales form depending upon the water characteristics of the source of the industrial water.

It is often found that depending on the impurities present in the water source used to access the industrial waters, the scales can range to include alumina based scales. Normally the waters that are accessed and include alumina as an impurity are those waters which are being softened by sodium aluminate, alumina, or other kinds of treatments involving aluminum containing compounds. Of particular concern is water that is treated with alum prior to its use in the recirculating industrial water system.

If one could control the amount of scale formation or precipitate of alumina based materials in these recirculating industrial waters used for heat exchange purposes, then one would be able to advance the art of water treatment for these purposes.

It is therefore an object of this invention to inhibit scale formation or precipitates of alumina based materials in recirculating industrial waters, particularly when these industrial waters are used for heat exchange purposes.

It is another object of this invention to prevent alumina based deposits from precipitating from recirculating industrial waters used for heat exchage purposes by using low molecular weight, readily available carboxylic acid containing materials.

It is yet another object of this invention to treat recirculating industrial waters for the purpose of inhibiting scale formation and precipitates of alumina and alumina based precipitates by adding to the industrial waters contaminated with an aluminum source an effective amount of a water-soluble low molecular weight multi-functional carboxylic acid either as the free acid or as any of a number of water-soluble salts.

THE INVENTION

I have discovered a method of inhibiting scale formation or precipitates of alumina based materials in recirculating industrial waters used for heat exchange purposes which comprises treating the recirculating industrial waters with an effective amount for the purpose of inhibiting alumina scale or precipitate formation of a water-soluble low molecular weight multi-functional carboxylic acid, or its water-soluble salts. By alumina based material I mean any precipitate, scale, or precipitating species which contain $Al_2O_3$, its hydrates, metal salts, aluminates or metallic aluminates, as complex scaling or precipitating species which may contain the same. These alumina based materials particularly refer to alumina and/or its common hydrates which may be insoluble under water conditions normally present in waters treated with alum or its substitutes, such as other aluminate salts.

The multi-functional carboxylic acid or water-soluble salts thereof normally have a molecular weight ranging between about 150 to 1,500. The multi-functional carboxylic acid contains at least two carboxylic acid functional groups, preferably at least three carboxylic acid functional groups, and most preferably contains, in addition to the carboxylic acid groups, one or more alcohol functional groups.

The multi-functional carboxylic acid, or its water-soluble salts, can best be represented by the formula:

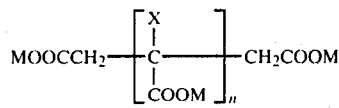

wherein M is, at each occurrence, chosen from the group consisting of hydrogen, sodium, lithium, potassium, ammonium, amino or quaternary ammonium organic cations, magnesium, calcium, and mixtures thereof; X is, at each occurrence, chosen from the group consisting of hydrogen and an alcohol group, and mixtures thereof; and n ranges between about 1–5.

Preferably the multi-functional carboxylic acid or its water-soluble salt, is represented by the formula above, wherein M is, at each occurrence, chosen from hydrogen, sodium, ammonium, potassium, and mixtures thereof; X is hydroxyl, and n ranges from 1–3.

Most preferably the multi-functional carboxylic acid is citric acid or any of its water-soluble salts, including sodium salts, ammonium salts, lithium salts, potassium salts, magnesium salts, calcium salts, or mixtures thereof, or mixed salts thereof.

When using the multi-functional carboxylic acid containing compounds for inhibiting scale formation or precipitates of alumina based materials, an effective amount of these water-soluble low molecular weight multi-functional carboxylic acid compounds or their water-soluble salts must be added to the recirculating industrial waters. An effective amount may be the addition of at least 0.5 ppm of the multi-functional carboxylic acid or its water-soluble salts; however, it is preferred to add at least 10 ppm of this multi-functional carboxylic acid or its salts; and most preferably, at least 20 ppm of these low molecular weight multi-functional carboxylic acid compounds, or their water-soluble salts. The industrial waters to which the low molecular weight multi-functional carboxylic acid, or its water-soluble salts, are added may also contain other ingredients, the purpose of which is to inhibit other type of scale formation or to prevent corrosion or both. Such compounds may include ortho phosphate salts, organo phosphate salts, organo phosphonate salts, low molecular weight dispersant polymers having a molecular weight of at least 2,000 and above, as well as other compounds such as zinc salts, tolyltriazole compounds and the like. It is important that the pH of the recirculating industrial waters be maintained between about 6.0 and about 9.0. It is preferred that the recirculating industrial waters have a pH ranging between about 6.5 to about 8.5.

To better demonstrate the instant invention, the following examples are given.

EXAMPLES

The make-up water source for the system is an alum treated water with alum carryover. A series of bench screening studies were initiated to simulate and solve the alumina solubility problem. Ortho phosphate was used as a reactant to precipitate the alumina. This method was used to determine the extent of chelation/sequestration of the alumina based upon soluble vs. insoluble ortho phosphate levels. This kind of precipitation reaction is commonly used in waste treatment operations for the removal of ortho phosphate by the addition of alum.

A summary of the results to be presented is as follows:

1. Citric acid used at 20 ppm gave a 92% recovery of soluble vs. insoluble ortho phosphate, whereas a blank run without any kind of alumina stabilizer added typically gives a 55% recovery of same.

2. Polymeric treatments affected only floc size of the precipitate, but did not appreciably effect precipitate formation.

3. Organo phosphorus compounds such as HEDP and PTA showed activity, some alumina stabilization effect, but only at high levels of treatment.

Testing was conducted using a six gang stirrer, 6 1500 ml beakers and stopwatch. All experiments were stirred at 50 rpm for 30 minutes, soluble vs. insoluble ortho phosphate analysis was performed before and after stirring; pH was also measured. Synthetic recirculating industrial water was made, and spiked with approximately 4 ppm ortho phosphate. This water was then put into the six beakers. An initial ortho phosphate analysis was run to determine actual $PO_4$ level. The beakers were put under gang stirrer, and stirred at 50 rpm. Stabilizer (product) was then added at concentrations that ascended starting with beakers #1 to #6. pH was checked at this time and adjusted with $NaOH/H_2SO_4$ to compensate for acidity or alkalinity of product. At this point, 4 ppm alum ($Al_2O_3$) was added to each beaker, pH was measured and adjusted if necessary and 30 minutes timing commenced. During the stirring period turbidity and floc size were usually observed and recorded. After 30 minutes, stirring was stopped and all beakers sampled and analyzed for total and soluble ortho phosphate. Soluble $oPO_4$ was determined after filtration through a 0.45 micro filter pad. A blank was run (with no stabilizer added) to determine the base line degree of total vs. soluble ortho phosphate.

The water used had the following characteristics although no limitations of our invention should be inferred thereby:

| EXPERIMENTAL SYNTHETIC INDUSTRIAL WATER (RECIRCULATING) | | |
|---|---|---|
| 850 | ppm = | calcium hardness (as $CaCO_3$) |
| 122 | ppm = | magnesium hardness (as $CaCO_3$) |
| 30 | ppm = | M alkalinity |
| 65 | ppm = | silica (as $SiO_2$) |
| 7.0 | = | pH |

In the following tables, the abbreviations used have the following meanings:
TPO$_4$ = Total phosphate
oPO$_4$ = Ortho phosphate
PTA = 2-Phosphonobutane 1,2,4 tricarboxylic acid
HEDP = 1-Hydroxyethylidine diphosphonic acid
Polymer I = A 60:20:20 weight percentage of acrylic acid; Methacrylic acid; t-Butylacrylamide, molecular weight between 10,000–20,000.
Polymer II = Hydrolyzed polymer of maleic anhydride, molecular weight range 1,000–5,000.

Results—Run 1
Product—PTA* (organo phosphorus)

Beakers: The data below is presented as the ratio of total phosphate/soluble phosphate (as ppm $PO_4$).

| | #1 | #2 | #3 | #4 | #5 | #6 |
|---|---|---|---|---|---|---|
| PTA Treatment level, ppm: | 10 | 20 | 30 | 40 | 50 | 60 |
| TPO$_4$ | 5.7/3.4 | 7.5/4.9 | 9.8/7.0 | 11.0/9.8 | 12.7/12.7 | 14.6/14.6 |
| oPO$_4$ | 4.3/2.1 | 4.2/2.0 | 4.3/2.1 | 4.3/2.7 | 4.2/3.2 | 4.2/3.8 |
| pH Range After 30 Minutes: | | | 7.7–7.0 | | | |

COMMENTS

Fine floc in all beakers except #6, 90% recovery in #5, based on soluble/total oPO$_4$ × (100).

Results—Run 2
Product—HEDP (organo phosphorus)

Beakers: The data below is presented as the ratio of total phosphate/soluble phosphate (as ppm $PO_4$).

| | #1 | #2 | #3 | #4 | #5 | #6 |
|---|---|---|---|---|---|---|
| HEDP Treatment level, ppm: | 3 | 6 | 8 | 10 | 12 | 16 |
| TPO$_4$ | 6.0/2.9 | 7.5/3.9 | 8.8/5.5 | 10.3/7.3 | 12.6/8.6 | 13.0/11.2 |
| oPO$_4$ | 4.3/2.3 | 4.3/2.6 | 4.4/2.8 | 4.5/3.1 | 4.2/3.3 | 4.3/3.4 |
| pH Range After 30 minutes: | | | 7.3–6.8 | | | |

COMMENTS

All beakers cloudy, although less in #6 @ 79% recovery.

Results—Run 3
Product—Polymer I of Acrylic Acid/Acrylamide

Beakers:

| | #1 | #2 | #3 | #4 | #5 | #6 |
|---|---|---|---|---|---|---|
| Polymer 1 | 15 ppm | 18 ppm | 34 ppm | 55 ppm | 62 ppm | 70 ppm |
| oPO$_4$ | 4.0/2.3 | 3.5/2.3 | 3.4/2.5 | 3.2/2.8 | 3.4/2.8 | 3.2/2.8 |
| pH Range after 30 Minutes: | | | 7.2–7.1 | | | |

COMMENTS

1 beaker has coarse floc progressing to very fine in beaker #6, 87% recovery in #6.

Results—Run 4
Product—Citric Acid

Beakers:

| | #1 | #2 | #3 | #4 | #5 | #6 |
|---|---|---|---|---|---|---|
| Citric Acid | 10 ppm | 20 ppm | 30 ppm | 40 ppm | 50 ppm | 60 ppm |
| oPO$_4$ | 5.2/2.9 | 5.0/4.6 | 5.2/5.0 | 5.0/4.7 | 5.1/4.8 | 5.1/5.0 |
| pH Range After 30 Minutes: | | | 6.9–6.9 | | | |

COMMENTS

No floc apparent in any beaker except a slight haze in #1 (upon standing), 92% recovery in #2, 98% in #6.

Results—Run 5
Product—Polymer II

Beakers:

| | #1 | #2 | #3 | #4 | #5 | #6 |
|---|---|---|---|---|---|---|
| Polymer II | 10 ppm | 20 ppm | 30 ppm | 40 ppm | 50 ppm | 60 ppm |
| oPO$_4$ | 4.0/1.6 | 4.0/1.8 | 4.0/1.8 | 3.9/1.7 | 3.8/1.8 | 3.8/2.1 |
| pH Range After 30 Minutes: | | | | | | |

-continued 6.7-6.5

COMMENTS

Floc present in all beakers, coarse in #1 to fine in #6, 55% recovery in #6.
Results—Run 6
Product—None (Blank)

| Beakers: | | | | | | |
|---|---|---|---|---|---|---|
| | #1 | #2 | #3 | #4 | #5 | #6 |
| oPO$_4$ | 4.2/2.3 | | | | | |
| pH After 30 Minutes: | | | | | | |
| | | | 7.6 | | | |

COMMENTS

Large floc formed after 10 minutes. Millipore filter (0.45 micron) saved for x-ray fluorescence. 55% recovery with no stabilizer present.

As can be seen from the summary and results above, the use of ortho phosphate by itself, organo phosphonates by themselves, low molecular weight dispersant polymers by themselves, or any combination of the above ingredients, does not provide adequate protection against the precipitation and formation of alumina precipitates and scales in the industrial waters tested. It is only when a low molecular weight water-soluble multi-functional carboxylic acid, such as citric acid, or its water-soluble salts, are used in quantities of at least 0.5 to 500 ppm, preferably between 1 to about 250 ppm, and most preferably from about 10 to 200 ppm, that a stabilized alumina containing industrial water has been obtained. In addition, the presence of these low molecular weight multi-functional carboxylic acids or their salts has a pronounced effect on the amount of alumina floc formed as the concentration of the multi-functional carboxylic acid, or its salts, is increased. Since other compounds can be added to these recirculating waters to disperse these alumina flocs, it may be useful that the multi-functional carboxylic acid compounds be used in combination with such dispersants.

The water-soluble dispersants can include low molecular weight polymers containing functional groups from the group carboxylic acid, amide, sulfonate, mixtures thereof, and the like. An example of these kinds of dispersant polymers may include low molecular weight vinylic dispersants having a molecular weight ranging between about 2,000–20,000 and consisting of monomers from the group acrylic acid, acrylamide, vinyl sulfonate, methacrylamide, methacrylic acid, and similar monomers, such as AMPS, sulfonated styrene, dialkyl dimethyl ammonium chloride, etc., as well as mixtures of each of these monomers or other vinylic monomers of the same type.

Once the multi-functional carboxylic acid has prevented alumina precipitation or floc formation, or at least inhibited scale formation and assisted in the formation of small particle sized alumina floc, the dispersant polymers can be useful to maintain either these alumina flocs or other scaling precipitates in a dispersed form so that they can be removed eventually in the blowdown from these recirculating water systems.

Having described my invention, I claim:

1. A method of preventing alumina-based deposits from precipitating from recirculating industrial waters having a pH between 6 and 9 used for heat exchange purposes and which have previously been treated with either alum or sodium aluminate which consists of adding to said industrial waters from 0.5 to about 500 ppm of citric acid or its water-soluble salts.

* * * * *